(12) United States Patent
Gordon

(10) Patent No.: US 8,778,293 B2
(45) Date of Patent: Jul. 15, 2014

(54) PRODUCTION OF AMMONIA FROM AIR AND WATER

(76) Inventor: Roger Gordon, Georgetown (CA)

( * ) Notice: Subject to any disclaimer, the term of this patent is extended or adjusted under 35 U.S.C. 154(b) by 1140 days.

(21) Appl. No.: 12/752,420

(22) Filed: Apr. 1, 2010

(65) Prior Publication Data

US 2011/0243828 A1    Oct. 6, 2011

(51) Int. Cl.
*C01C 1/04* (2006.01)
(52) U.S. Cl.
USPC .......................................... 423/362; 422/148
(58) Field of Classification Search
USPC ................... 423/362, 213.2, 239.1, 352, 359;
422/148, 168, 169, 170, 171, 178, 177,
422/180; 60/276, 282
See application file for complete search history.

(56) References Cited

U.S. PATENT DOCUMENTS

| | | | | |
|---|---|---|---|---|
| 1,386,760 | A | * | 8/1921 | Bosch ............................ 423/362 |
| 2,898,183 | A | | 8/1959 | Fauser |
| 3,395,982 | A | | 8/1968 | Didycz |
| 3,839,229 | A | * | 10/1974 | Senes et al. ...................... 502/73 |
| 6,474,330 | B1 | | 11/2002 | Fleming et al. |
| 7,708,966 | B2 | * | 5/2010 | Joshi ........................... 423/213.2 |

FOREIGN PATENT DOCUMENTS

WO       2010128682       11/2010

OTHER PUBLICATIONS

"Ammonia", Wikipedia, the free encyclopedia, accessed Nov. 11, 2009, pp. 1-28. Available: <http://wikipedia.org/wiki/Ammonia>.
"Amonia Production", Agrium, Jun. 30, 1999.
"Haber process", Wikipedia, the free encyclopedia, accessed Nov. 11, 2009, pp. 1-7. Available: <http://en.wikipedia.org/wiki/Haber_process>.
"Hydrogen production", Wikipedia, the free encyclopedia, accessed Nov. 11, 2009. pp. 1-12. Available: <http://en.wikipedia.org/wiki/Hydrogen_production>.
"PSA (Pressure Swing Adsorption) N2 Technology, Why are Parker PSA Systems Superior to Competing Suppliers?", Parker, accessed Nov. 11, 2009, pp. 1-2. Available: <http://parker-nni.com/n2_tech.html>.
"Pressure swing adsorption", Wikipedia, the free encyclopedia, accessed Nov. 11, 2009, pp. 1-3. Available: <http://en.wikipedia.org/wiki/Pressure_swing_adsorption>.
"Uses and Production of Ammonia (Haber Process)", Haber Process: Ammonia Production, Aus-e-Tute, accessed Nov. 11, 2009, pp. 1-3. Available: <http://www.ausetute.au/haberpro.html>.
Appl. M. "Ammonia", Ullmann's Encyclopedia of Industrial Chemistry, Weinheim: Wiley-VCH Verlad Gmbh & Co. KGaA, 2006, pp. 11, 44, 62-83, 116-120; 174 pages.
Written Opinion of the International Searching Authority for International application No. PCT/IB2013/000712, mailed Sep. 9, 2013, 9 pages.
International Search Report for International application No. PCT/IB2013/000712, mailed Sep. 9, 2013, 4 pages.

* cited by examiner

*Primary Examiner* — Stanley Silverman
*Assistant Examiner* — Syed Iqbal
(74) *Attorney, Agent, or Firm* — Doherty IP Law Group LLC

(57) ABSTRACT

A process for producing ammonia from air and water comprises producing nitrogen gas from air by pressure-swing-adsorption; producing hydrogen gas by electrolysis of water; compressing the nitrogen gas in a first cylinder to produce pressurized nitrogen gas; compressing the hydrogen gas in a second cylinder to produce pressurized hydrogen gas; compressing a mixture of the pressurized nitrogen and hydrogen gases in a third cylinder; heating the compressed mixture in the presence of a catalyst to react nitrogen and hydrogen to form ammonia; and extracting the ammonia from the mixture. A system for producing ammonia in the above process is also provided.

20 Claims, 1 Drawing Sheet

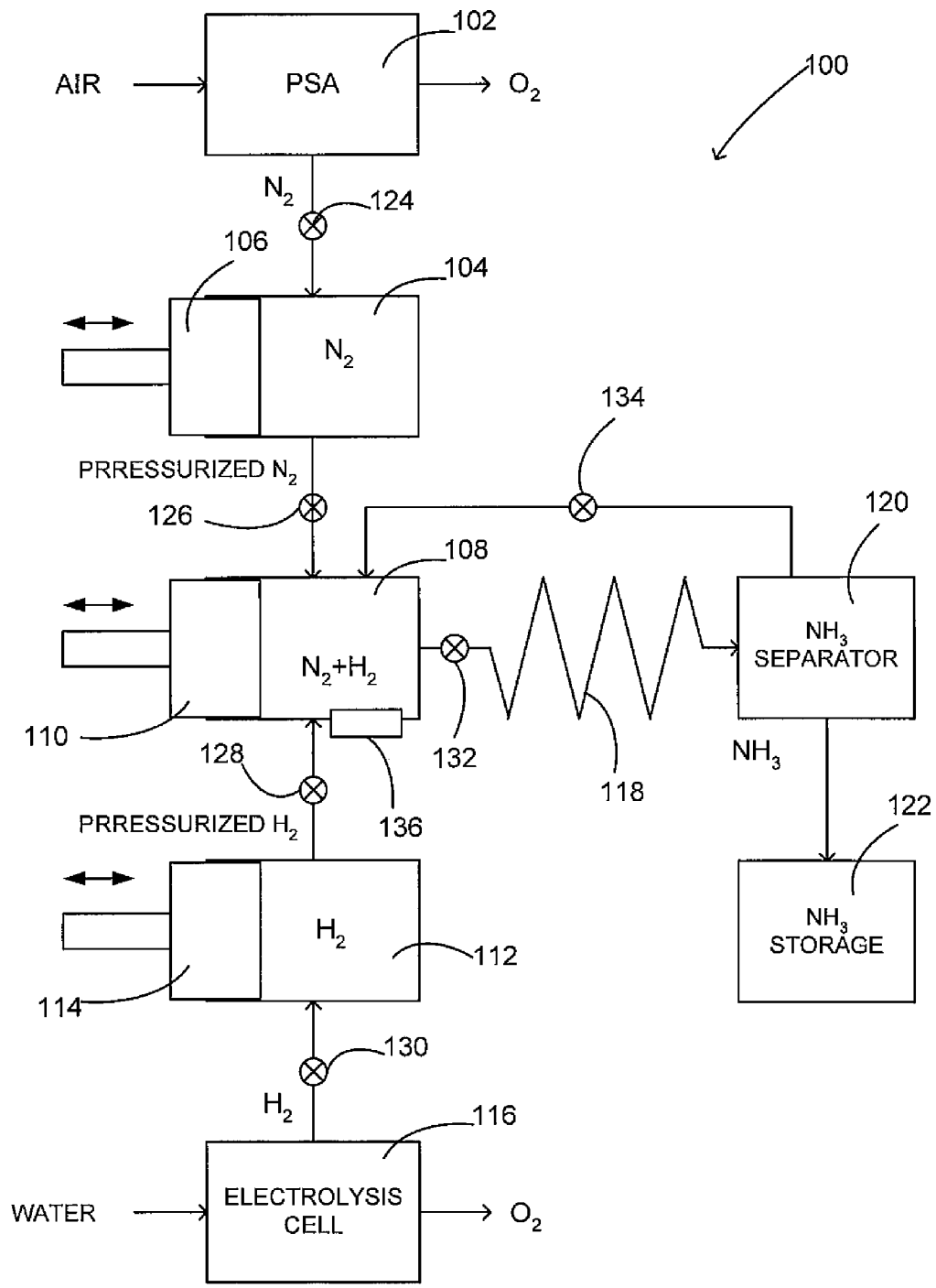

PRODUCTION OF AMMONIA FROM AIR AND WATER

FIELD OF THE INVENTION

The present invention relates to generally production of ammonia and specifically production of ammonia from air and water.

BACKGROUND OF THE INVENTION

Typically, ammonia is produced in processes involving conversion of organic materials, such as natural gas (methane) or petroleum products. Such processes produce environmentally un-friendly materials.

SUMMARY OF THE INVENTION

In accordance with an aspect of the present invention, there is provided a system for producing ammonia from air and water, comprising a pressure-swing-adsorption (PSA) nitrogen generator for extracting nitrogen gas from air; a hydrogen generator comprising an electrolysis cell for producing hydrogen gas from water; a first piston-cylinder gas compressor connected to the nitrogen generator for receiving and compressing the nitrogen gas to produce pressurized nitrogen gas; a second piston-cylinder gas compressor connected to the hydrogen generator for receiving and compressing the hydrogen gas to produce pressurized hydrogen gas; a reactor connected to the first and second cylinder gas compressors to receive the pressurized nitrogen and hydrogen gases, the reactor comprising a third piston-cylinder gas compressor for further compressing a mixture of the pressurized nitrogen and hydrogen gases, a heater for heating the mixture in the third compressor, and a catalyst in the third compressor for catalyzing a reaction of nitrogen and hydrogen in the mixture to form ammonia; a gas separator for separating ammonia from gases received from the reactor, the gas separator comprising an inlet connected to the reactor for receiving the gases from the reactor, a first outlet connected to the reactor for circulating the gases back to the reactor, and a second outlet for outputting the ammonia. The first piston-cylinder gas compressor may be adapted to produce the pressurized nitrogen gas at a pressure of from about 60 to about 70 psi. The second piston-cylinder gas compressor may be adapted to produce the pressurized hydrogen gas at a pressure of from about 30 to about 40 psi. The third piston-cylinder gas compressor may be adapted to compress the mixture of the pressurized nitrogen and hydrogen gases to a pressure up to about 2,800 psi. The third piston-cylinder gas compressor may be adapted to operate at a temperature of above 500° C. and a pressure of above 2,000 psi. The third piston-cylinder gas compressor may be adapted to operate at a temperature from about 450 to about 500° C. and a pressure of from about 2,000 to about 3000 psi. The catalyst may be selected from ruthenium, carbon steel, iron, titanium, stelite, and platinum, or a mixture of two or more thereof. The catalyst may be selected from ruthenium, iron, and titanium, or a mixture of two or more thereof. The system may comprise a catalyst bed containing the catalyst.

In accordance with another aspect of the present invention, there is provided a process for producing ammonia from air and water, comprising producing nitrogen gas from air by pressure-swing-adsorption; producing hydrogen gas by electrolysis of water; compressing the nitrogen gas in a first cylinder to produce pressurized nitrogen gas; compressing the hydrogen gas in a second cylinder to produce pressurized hydrogen gas; compressing a mixture of the pressurized nitrogen and hydrogen gases in a third cylinder; heating the compressed mixture in the presence of a catalyst to react nitrogen and hydrogen to form ammonia; and extracting the ammonia from the mixture. The pressurized nitrogen gas may have a pressure of from about 60 to about 70 psi. The pressurized hydrogen gas may have a pressure of from about 30 to about 40 psi. The mixture of the pressurized nitrogen and hydrogen gases may be compressed to a pressure up to about 2,800 psi. The catalyst may be selected from ruthenium, carbon steel, iron, titanium, stelite, and platinum, or a mixture of two or more thereof. The catalyst may be selected from ruthenium, iron, and titanium, or a mixture of two or more thereof. The pressurized nitrogen and hydrogen gases may be reacted at a temperature from about 450 to about 500° C. and a pressure of about 2,000 to about 3000 psi, or at a temperature of above 500° C. and a pressure of above 2,000 psi. The volume ratio of hydrogen to nitrogen in the mixture of the pressurized nitrogen and hydrogen gases may be about 3:1.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention, FIG. 1 is a schematic block diagram of an ammonia production system, exemplary of an embodiment of the present invention.

DETAILED DESCRIPTION

FIG. 1 schematically depicts an ammonia production system 100, exemplary of an embodiment of the present invention. As will become apparent, in different applications, system 100 may be implemented on different scales. For example, it may form a part of a production plant (not shown) or the fuel source in an automobile (not shown).

System 100 includes a pressure-swing-adsorption (PSA) nitrogen generator 102, a piston-cylinder compressor 104 with a compression piston 106, a piston-cylinder compressor 108 with a compression piston 110, a piston-cylinder compressor 112 with a compression piston 114, an electrolysis cell 116, a coiled equilibrium loop 118, a separator 120, and a storage tank 122, which are connected through valves 124, 126, 128, 130, 132, 133, 134, and 135 as illustrated in FIG. 1.

Briefly, system 100 converts air to ammonia ($NH_3$) by extracting nitrogen from air and generating hydrogen from water, and then reacting nitrogen and hydrogen under high pressure to form ammonia. The main by-product of the process is oxygen. Consequently, the production process produces no carbonaceous pollutants.

System 100 has two input legs. One leg includes PSA nitrogen generator 102 and compressor 104, which are connected to each other to produce pressurized nitrogen from air. The other leg includes electrolysis cell 116 and compressor 112, which are connected to each other to produce pressurized hydrogen from water.

The pressurized nitrogen and hydrogen gases are mixed, further pressurized, and heated in compressor 108, which contains a catalyst bed 136. The heated, pressurized gases react in the presence of the catalyst to produce ammonia. Both reacted and unreacted gases are then fed into loop 118, where additional ammonia is produced. The ammonia product is separated from other gases in Separator 120 and sent to Storage 122.

More specifically, in the first input leg, PSA nitrogen generator 102 takes air as input and outputs oxygen and nitrogen.

PSA nitrogen generator 102 utilizes the fact that oxygen and nitrogen gases in the air can be adsorbed on solid surfaces of an adsorbent (not separately shown) under pressure. The higher the pressure, the more gases adsorbed. When the pressure is later reduced, the adsorbed gas can be released (desorbed). Further, a given adsorbent can attract one gas (such as nitrogen) more strongly than another gas (such as oxygen) under the same pressure. Thus, in one embodiment, air may be pressurized in a vessel (not separately shown) containing an adsorbent selected to preferentially attract nitrogen in PSA nitrogen generator 102, nitrogen will be preferentially adsorbed. After the remaining air is removed, and the pressure is lowered in the vessel, the adsorbed nitrogen can be released and collected as a gas. The released nitrogen gas can then be fed to compressor 104. As can be understood, to save energy and increase efficiency, multiple pressure vessels may be used in PSA nitrogen generator 102.

PSA nitrogen generator 102 may be constructed based on techniques known to those skilled in the art, and may be obtained from commercial sources. For example, Model P2 provided by OGSI (Oxygen Generating Systems International) may be used as the PSA nitrogen generator. According to OGSI, the adsorbent used in Model P2 includes alumina beads.

The nitrogen output from PSA nitrogen generator 102 should be sufficient to support the desired ammonia output. In one embodiment, the output rate of nitrogen from generator 102 may be about 1 ft$^3$/min at atmospheric pressure.

Compressor 104 compresses the nitrogen gas by reducing the gas volume using mechanical force, as can be understood by those skilled in the art. Compression piston 106 may be driven by a suitable motor or shaft servo (not shown). The motor or shaft servo may be hydraulically or electrically powered. The pressure of output gas from compressor 104 may be from about 60 to about 70 psi. In one embodiment, the cylinder of compressor 104 may be made of a carbon shell tube, with an internal dimension of about 3 inch in diameter and about 24 inch in length.

At the end of the first leg, the pressurized nitrogen gas is fed to compressor 108.

In the second input leg, hydrogen is produced from water in electrolysis cell 116, utilizing the known electrolysis reactions that produce hydrogen from water, through the decomposition reaction:

$$2\,H_2O \leftrightarrow 2H_2 + O_2 \qquad (1).$$

Electrolysis cell 116 may included a water electrolysis hydrogen generator available from commercial suppliers, such as Claind™, Hgen™, or Electrolyser™. Electrolysis cell 116 may include a stainless electrolyser and a stainless shell. Electrical potentials may be applied to the anode and cathode of the cell to establish an electric current through the cell. A DC (direct current) voltage from 24 V to 80 volt may be applied between the anode and cathode.

It is not necessary to heat the cell during production as the electrolysis reaction may produce enough heat to maintain a sufficient reaction temperature. Additional heating may also cause the electrolyser to overheat.

Compressor 112 operates in a similar manner as compressor 104 does. The pressure of output gas from compressor 112 may be from about 30 to about 40 psi.

In one embodiment, the cylinder of compressor 112 may be made of a carbon shell tube, with an internal dimension of about 3 inch in diameter and about 24 inch in length.

In one embodiment, the cylinder of compressor 108 may be made of a carbon steel tube, with an internal dimension of about 3 inch in diameter and about 36 inch in length. Compressor 108 also serves as a mixer, and has a first inlet for receiving pressurized nitrogen gas from compressor 104, a second inlet for receiving pressurized hydrogen gas from compressor 112, and a third inlet for receiving recycled gases from the return line of loop 118 through valve 134. Compressor 108 also has an outlet for feeding pressurized mixture of hydrogen, nitrogen and ammonia gases to loop 118.

Catalyst bed 136 contains a suitable catalyst such as ruthenium, titanium, iron, mixtures of titanium and iron, or mixtures of ruthenium and iron. Catalyst bed 136 may be provided in any suitable form. In one embodiment, catalyst bed 136 may include a pipe with a removable cap (not separately shown). Catalyst bed 136 may be configured and positioned so that it is not obstructing the gas flow.

It is not necessary to compress the gas mixture in compressor 108 with a mechanical force provided by piston 110 to reach the reaction pressure. The partially compressed gas may be further compressed by heating to reach the reaction pressure. The pressure applied by piston 110 may be up to about 2,800 psi.

Compressor 108 may also be pre-heated before taking any input. Heating may be effected in any suitable manner, such as using propane as fuel or using an electric heating element (not shown). A thermostat (not shown) and a temperature control system (not shown) may be provided to control the heating operation.

In one embodiment, the reaction temperature in compressor 108 may be above 500° C., and the reaction pressure in compressor 108 may be above 2,000 psi. The operating pressure in compressor 108 may be from about 2,000 to about 3,000 psi. The reaction temperature and pressure, however, can vary and may be different in different embodiments. The reaction temperature and pressure may be selected by those skilled in the art based on the desired reaction rate and yield, and other factors in a particular embodiment or application.

Hydrogen and nitrogen gases may be fed to compressor 108 at a ratio selected to optimize reaction efficiency. For example, the volume ratio of hydrogen gas to nitrogen gas fed to compressor 108 may be about 3:1. The gases may be fed to compressor 108 at a pressure of about 20 psi.

Loop 118 may include a coiled pipe made from carbon steel tube or stainless tube. In some embodiments, carbon steel may be used, as the iron content in carbon steel may have some catalytic effect on the ammonia producing reactions. Loop 118 may be configured and adapted to withstand input gas pressure of about 2500 psi and input gas temperature of about 450 to about 475° C. The output from loop 118 at valve may have a slightly lower temperature.

In loop 118, the gases are allowed to further react. While the gases in loop 118 are reacting to produce further ammonia, valve 132 may be closed to allow further gas input, compression, heating, and reaction to occur in compressor 108. Thus, ammonia may be more efficiently produced. Loop 118 may be made of stainless steel or carbon steel. Carbon steel may be advantageous as ammonia production is expected to be facilitated by the presence of carbon steel on the surface of a carbon steel material. For this and other reasons, the fittings downstream of compressor 108 may be made of stainless or cast iron. It is expected that copper and brass may degrade when exposed to ammonia, and thus should be avoided.

Valves 132 and 133 may be normally closed. For example, valve 132 may be opened and valve 133 may be closed when feeding gas from compressor 108 into loop 118. Feeding may be effected by pushing piston 110 inward. Feeding may also be effected by establishing a pressure difference between the gas in compressor 108 and the gas in loop 118 so that gas will flow from compressor 108 towards loop 118. Valve 132 may be closed and valve 133 may be opened when withdrawing gas from loop 118 into separator 120. Gas flow may be established by pressure differential.

Separator 120 may include a stainless steel vessel with a top outlet connected to valve 134 and a bottom outlet connected to valve 135. Ammonia may be separated from other gases based on the fact that under pressure ammonia is in the form of a liquid and is heavier than the other gas components. Thus, liquid ammonia may be collected through the bottom outlet connected to valve 135 and the lighter gas components may be extracted from separator 120 through the top outlet connected to valve 134.

Separator 120 may be configured for batch separation or continuous separation. A computer (not shown) may be provided to control the continuous separation operation.

In use, system 100 may be operated as follows.

Operation of $N_2$-input leg

PSA nitrogen generator 102 may be operated in a batch mode. Valve 124 is closed as $N_2$ is being extracted from air. Valve 126 is opened and piston 106 is pushed in to expel gas from compressor 104 into compressor 108. When loading $N_2$ into compressor 108, valves 128, 132 and 134 are also closed.

When a batch of $N_2$ gas has been extracted and is ready for use, valve 126 is closed, valve 124 is opened, and piston 106 is pulled out to draw $N_2$ gas from PSA nitrogen generator 102 into compressor 104.

Next, valve 124 is closed and valve 126 is opened, and piston 106 is pushed in to press pressurized $N_2$ gas into compressor 108. To prevent significant back flow, piston 106 may be pushed in partially or fully before opening valve 126, so that the pressure in compressor 104 is substantially higher than the pressure in compressor 108. At this time, piston 110 may be pulled out completely to provide the maximum gas volume in compressor 108.

Valve 126 is next closed. The next batch of $N_2$ gas can then be loaded into compressor 104 by repeating the above procedure.

Operation of $H_2$-Input Leg

Electrolysis cell 116 may be operated in a batch or continuous mode to produce $H_2$ gas.

The $H_2$ gas produced by electrolysis cell 116 may be fed to compressor 112 in batch mode as follows.

Valve 128 is opened, valve 130 is closed, and piston 114 is pushed in to expel gas from compressor 112 into compressor 108. When loading $H_2$ into compressor 108, valves 126, 132 and 134 are closed.

Next, valve 128 is closed, valve 130 is opened, and piston 114 is pulled out to draw $H_2$ gas from Electrolysis cell 116 into compressor 112.

Valve 130 is then closed and valve 128 is opened, and piston 114 is pushed in to press pressurized $H_2$ gas into compressor 108. To prevent significant back flow, piston 114 may be pushed in partially or fully before opening valve 128, so that the pressure in compressor 112 is substantially higher than the pressure in compressor 108. Again, when feeding $H_2$ gas, piston 110 may be pulled out completely to provide the maximum gas volume in compressor 108.

Valve 128 is next closed. The next batch of $H_2$ gas can then be loaded into compressor 112 by repeating the above procedure.

$N_2$ and $H_2$ gases may be fed into compressor 108 simultaneously or at different times.

Operation of Reaction Components

After a batch of desired amounts of $H_2$ and $N_2$ gases is loaded into compressor 108, valves 126 and 128 are closed and remain in the closed state until next loading. The volume ratio of $H_2$ to $N_2$ in compressor 108 may be about 3:1.

With valves 132 and 134 still in the closed state, piston 110 is pushed in to compress the gas mixture in compressor 108, such as to a pressure of 30 to 40 psi. To accelerate reaction, compressor 108 may be heated, such as to a temperature of from about 450 to about 500° C. Upon heating, the pressure in the compressor may also increase. The operating pressure in compressor 108 may reach 2,000 to 3000 psi. At the operating temperature and pressure, and in the presence of the catalyst, ammonia is produced according to reaction (2):

$$N_2(g) + 3\,H_2(g) \rightleftharpoons 2\,NH_3(g) \qquad (2)$$

Reaction (2) is exothermic ($\Delta H = -92.4$ kJ/mol at room temperature) and the heat generated by the reaction may be conveniently used to heat the reaction system. Thus, after initial heating, it is not necessary to heat the system with an external heat source.

During reaction, the temperature in compressor 108 may be controlled. For example, a cooling coil (not shown) may be provided around compressor 108 to remove heat generated by the reaction. The removed heat energy may be provided to another component, such as the unit for generating hydrogen with electrolysis cell 116.

A suitable amount of catalyst may be placed in catalyst bed 136. For example, about 10 to about 40 g of catalyst may be placed in catalyst bed 136. In different embodiments, ruthenium, carbon steel, iron, titanium, stelite, platinum, or a mixture thereof may be used as the catalyst.

Increasing reaction pressure will shift the equilibrium position to the right hand side of Reaction (2), resulting in a higher yield of ammonia. Thus, the reaction pressure in compressor 108 and loop 118 should be maintained at above about 2,000 psi, such as from about 2,000 to about 3,000 psi. Further increase in pressure may further increase yield, but may also increase the equipment and operation costs.

While reducing temperature can shift the equilibrium position to the right hand side in Reaction (2), resulting in increased yield, it also reduces reaction rate. Therefore, to optimize the overall rate of production and yield, the reaction temperature in compressor 108 and loop 118 should be selected to balance these two effects. In one embodiment, the balance may be achieved at a reaction temperature in the range of about 450 to about 500° C.

While such a high temperature is desirable to provide a high reaction rate, and for the catalyst to be effective, the equilibrium in reaction (2) is shifted to the right hand side of reaction (2) at a higher temperature. Thus, the conversion rate on each pass at the operating temperature and pressure may not be very high. To address this issue, the un-reacted gases may be recycled through compressor 108, via loop 118.

The un-reacted gases may also react in loop 118, thus improving the overall yield.

To this end, after a selected period of reaction at the selected temperature and pressure, such as about one second, valve 132 is opened to transport the reaction mixture with ammonia gas produced into loop 118. When feeding gas into loop 118, valve 133 is closed. The pressure in loop 118 may be reduced to below the pressure in compressor 108 prior to opening valve 132.

After the pressures in compressor 108 and loop 118 reach equilibrium, valve 132 may be closed.

Operation of Output Components

The reaction product gas (ammonia) and unreacted gases are withdrawn from loop 118 by opening valve 133, and fed into separator 120, with valve 135 closed. The gas may flow due to pressure differential.

Ammonia gas is fed to storage 122 through valve 135.

Un-reacted gases may be fed back to compressor 108 through valve 134, such as by opening valve 134 and pulling out piston 110. Recycled gasses may be mixed with new input hydrogen and nitrogen gases.

The above procedure may be repeated to produce additional batches of ammonia gas.

In one embodiment, the power consumption at different stages may be as listed in Table I, with the input gas volume at compressor 108 for each batch being 1-2 L of $N_2$ and 2-6 L of $H_2$.

TABLE I

| Energy Input | |
|---|---|
| Unit | Power (kw) |
| 102 | 1 |
| 116 | 7 |
| 106/110/114 | 5 |

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A system for producing ammonia from air and water, comprising:
   a pressure-swing-adsorption (PSA) nitrogen generator for extracting nitrogen gas from air;
   a hydrogen generator comprising an electrolysis cell for producing hydrogen gas from water;
   a first piston-cylinder gas compressor connected to said nitrogen generator for receiving and compressing said nitrogen gas to produce pressurized nitrogen gas;
   a second piston-cylinder gas compressor connected to said hydrogen generator for receiving and compressing said hydrogen gas to produce pressurized hydrogen gas;
   a reactor connected to said first and second cylinder gas compressors to receive said pressurized nitrogen and hydrogen gases, said reactor comprising
   a third piston-cylinder gas compressor for further compressing a mixture of said pressurized nitrogen and hydrogen gases,
   a heater for heating said mixture in said third compressor, and
   a catalyst in said third compressor for catalyzing a reaction of nitrogen and hydrogen in said mixture to form ammonia;
   a first valve located between said first piston-cylinder gas compressor and said reactor, wherein said first valve is closed as said first piston-cylinder gas compressor begins to compress said nitrogen gas, and wherein said first valve is opened only after the pressure level of said pressurized nitrogen gas within said first piston-cylinder gas compressor is greater than the pressure level within said third piston-cylinder compressor;
   a second valve located between said second piston-cylinder gas compressor and said reactor, wherein said second valve is closed as said second piston-cylinder gas compressor begins to compress said hydrogen gas, and wherein said second valve is opened only after the pressure level of said pressurized hydrogen gases within said second piston-cylinder gas compressor is greater than the pressure level within said third piston-cylinder compressor;
   a gas separator for separating ammonia from gases received from said reactor, said gas separator comprising an inlet connected to said reactor for receiving said gases from said reactor, a first outlet connected to said reactor for circulating said gases back to said reactor, and a second outlet for outputting said ammonia.

2. The system of claim 1, wherein said first piston-cylinder gas compressor is adapted to produce said pressurized nitrogen gas at a pressure of from about 60 to about 70 psi.

3. The system of claim 2, wherein said second piston-cylinder gas compressor is adapted to produce said pressurized hydrogen gas at a pressure of from about 30 to about 40 psi, further comprising:
   a first volume control valve located between said nitrogen generator and said first piston-cylinder gas compressor for controlling the volume of nitrogen gas introduced into said first piston-cylinder gas compressor;
   a second volume control valve located between said hydrogen generator and said second piston-cylinder gas compressor for controlling the volume of hydrogen gas introduced into said second piston-cylinder gas compressor, wherein said first and second volume control valves control the volume ratio of said hydrogen gas to said nitrogen gas received by said reactor.

4. The system of claim 1, wherein said third piston-cylinder gas compressor is adapted to compress said mixture of said pressurized nitrogen and hydrogen gases to a pressure up to about 2,800 psi.

5. The system of claim 1, wherein said catalyst is selected from ruthenium, carbon steel, iron, titanium, stelite, and platinum, or a mixture of two or more thereof.

6. The system of claim 1, wherein said catalyst is selected from ruthenium, iron, and titanium, or a mixture of two or more thereof.

7. The system of claim 1, comprising a catalyst bed containing said catalyst.

8. The system of claim 1, wherein said third piston-cylinder gas compressor is adapted to operate at a temperature of above 500° C. and a pressure of above 2,000 psi.

9. The system of claim 1, wherein said third piston-cylinder gas compressor is adapted to operate at a temperature from about 450 to about 500° C. and a pressure of from about 2,000 to about 3000 psi.

10. A process for producing ammonia from air and water, comprising:
    producing nitrogen gas from air by pressure-swing-adsorption;
    producing hydrogen gas by electrolysis of water;
    compressing said nitrogen gas in a first cylinder to produce pressurized nitrogen gas;
    compressing said hydrogen gas in a second cylinder to produce pressurized hydrogen gas;
    introducing said pressurized nitrogen gas into a third cylinder only after the pressure level of said pressurized nitrogen gas within said first cylinder is greater than the pressure level within said third cylinder;
    introducing said pressurized hydrogen gas into said third cylinder only after the pressure level of said pressurized hydrogen gas within said second cylinder is greater than the pressure level within said third cylinder;

compressing a mixture of said pressurized nitrogen and hydrogen gases in said third cylinder;

heating said compressed mixture in the presence of a catalyst to react nitrogen and hydrogen to form ammonia; and extracting said ammonia from said mixture.

11. The process of claim 10, wherein said pressurized nitrogen gas has a pressure of from about 60 to about 70 psi.

12. The process of claim 10, wherein said pressurized hydrogen gas has a pressure of from about 30 to about 40 psi.

13. The process of claim 10, wherein said mixture of said pressurized nitrogen and hydrogen gases is compressed to a pressure up to about 2,800 psi.

14. The process of claim 10, wherein said catalyst is selected from ruthenium, carbon steel, iron, titanium, stelite, and platinum, or a mixture of two or more thereof.

15. The process of claim 10, wherein said catalyst is selected from ruthenium, iron, and titanium, or a mixture of two or more thereof.

16. The process of claim 10, wherein said pressurized nitrogen and hydrogen gases are reacted at a temperature from about 450 to about 500° C. and a pressure of about 2,000 to about 3000 psi.

17. The process of claim 10, wherein said pressurized nitrogen and hydrogen gases are reacted at a temperature of above 500° C. and a pressure of above 2,000 psi.

18. The process of claim 10, wherein a volume ratio of hydrogen to nitrogen in said mixture of said pressurized nitrogen and hydrogen gases is about 3:1.

19. The process of claim 10, further comprising:
providing a first valve located between said first cylinder and said third cylinder;
closing said first valve as said first cylinder begins to compress said nitrogen gas; and
opening said first valve when the pressure level of said pressurized nitrogen gas is greater than the pressure level of said gas within said third cylinder.

20. The process of claim 19, further comprising:
providing a second valve located between said second cylinder and said third cylinder;
closing said second valve as said second cylinder begins to compress said hydrogen gas; and
opening said second valve when the pressure level of said pressurized hydrogen gas is greater than the pressure level of said gas within said third cylinder.

* * * * *